United States Patent [19]  [11] Patent Number: 5,041,510
Allen et al.  [45] Date of Patent: Aug. 20, 1991

[54] ACRYLIC COPOLYMERS EXHIBITING NONLINEAR OPTICAL RESPONSE

[75] Inventors: Diane Allen, Springfield; Cherylyn Lee, Baskingridge; Ronald N. DeMartino, Wayne, all of N.J.

[73] Assignee: Hoechst Celanese Corp., Somerville, N.J.

[21] Appl. No.: 477,283

[22] Filed: Feb. 7, 1990

[51] Int. Cl.⁵ .................. C08F 12/30; C08F 14/18
[52] U.S. Cl. .................... 526/243; 526/244; 526/245; 526/288; 526/310; 526/311; 526/312
[58] Field of Search .............. 526/245, 243, 246, 288, 526/310, 311, 312

[56] References Cited

U.S. PATENT DOCUMENTS 4,882,402 11/1989 Leslie et al. .................. 526/245

Primary Examiner—Paul R. Michl
Assistant Examiner—Thomas McDonald, Jr.
Attorney, Agent, or Firm—DePaoli & O'Brien

[57] ABSTRACT

This invention provides novel side chain copolymers which exhibit nonlinear optical response, and which have utility as a transparent optical component in all-optical and electrooptical light switch and light modulator devices.

An invention side chain copolymer is illustrated by the following structure:

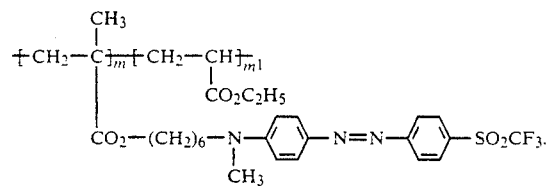

3 Claims, No Drawings

ACRYLIC COPOLYMERS EXHIBITING NONLINEAR OPTICAL RESPONSE

This invention was made with Government support under Contract Number F49620-C-0129 awarded by the Department of Defense. The Federal Government has certain rights in this invention.

CROSS-REFERENCE TO RELATED PATENT APPLICATIONS

The present patent application has subject matter related to the disclosure of copending U.S. patent application Ser. No. 148,262, filed Jan. 25, 1988; now U.S. Pat. No. 4,913,844 patent application Ser. No. 156,051, filed Feb. 16, 1988; now U.S. Pat. No. 4,826,950 and patent application Ser. No. 477,267 filed Feb. 7, 1990.

BACKGROUND OF THE INVENTION

Polymers with a comb structure of pendant side chains are a new class of organic materials which exhibit interesting optical properties.

Comb-like liquid crystalline polymers are described in Eur. Polym J., 18, 651 (1982); Advanced Polymer Science, Liquid Crystal Polymers II/III, Springer-Verlag, New York (1984), pages 215–220; and in U.S. Pat. Nos. 4,293,435 and 4,631,328. The disclosed polymeric structures have been developed for their mesogenic optical properties which have prospective utility in opto-electronic display devices.

In U.S. Pat. Nos. 4,694,066; 4,755,574; and 4,762,912 liquid crystalline polymers are described which have pendant side chains which exhibit nonlinear optical susceptibility, in addition to mesogenic properties. U.S. Pat. No. 4,792,208 discloses nonlinear optically responsive organic compounds and side chain polymers in which the molecular dipoles have an electron donor moiety linked through a conjugated bonding system to an electron acceptor sulfonyl moiety. Japanese patent application 88175834 discloses acrylate polymers and copolymers which have nitro(ethylhydroxyethylamino)azobenzene side chains. J. Org. Chem., 53, 5538 (1988) describes the synthesis and reactions of cyanovinyl-substituted benzenediazonium salts, and the production of acrylate copolymers with azostilbene dye side chains.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Liquid crystalline side chain polymers which exhibit nonlinear optical properties are suitable for application as a nonlinear optical component in optical light switch and light modulator devices. One disadvantage of a liquid crystalline side chain polymer optical medium is a loss of transmission efficiency due to light scattering by deviations from ideal mesogenic order.

There is continuing interest in the theory and practice of optically-responsive polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel optically responsive monomers and polymers.

It is another object of this invention to provide acrylic copolymers having side chains which exhibit nonlinear optical response.

It is a further object of this invention to provide optical light switch and light modulator devices with a transparent polymeric nonlinear optical component comprising a thin film of an acrylic copolymer with nonlinear optically-responsive pendant side chains which can be uniaxially oriented by an external field.

Other objects and advantages of the present invention shall become apparent from the accompanying description and examples.

DESCRIPTION OF THE INVENTION

One or more objects of the present invention are accomplished by the provision of an isotropic acrylic copolymer which is characterized by recurring monomeric units corresponding to the formula:

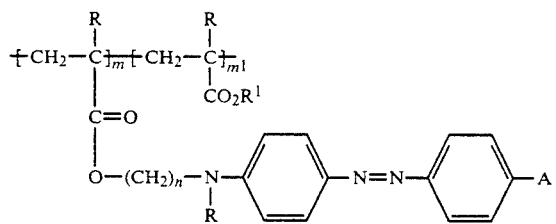

where R is hydrogen or a $C_1$–$C_4$ alkyl substituent; $R^1$ is a $C_1$–$C_6$ alkyl substituent; m and $m^1$ are integers which total at least 10; n is an integer between about 1–20; and A is $-SO_2CF_3$,

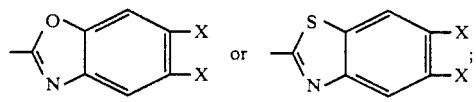

and X is $-H$, $-CN$, $-NO_2$ or $-CF_3$.

A typical copolymer of the present invention has a weight average molecular weight in the range between about 5000–200,000 and a glass transition temperature in the range between about 40°–150° C.

A present invention copolymer has pendant side chains which exhibit nonlinear optical susceptibility $\beta$. A copolymer can be formed into a nonlinear optical medium, such as a transparent film or coating on a substrate. A copolymer can be applied to a supporting substrate by conventional means, such as spin coating, spraying, Langmuir-Blodgett disposition, and the like.

A film or coating fabricated with a present invention copolymer exhibits third order nonlinear optical susceptibility.

A nonlinear optical medium of the present invention can be subjected to an external field to uniaxially orient the copolymer side chains. In one method the polymer medium is heated close to or above the copolymer glass transition temperature $T_g$, then an external field (e.g., a DC electric field) is applied to the medium of mobile copolymer molecules to induce uniaxial molecular alignment of polymer side chains parallel to the applied field, and the medium is cooled while maintaining the external field effect.

By this method a present invention nonlinear optical medium has a stable uniaxial alignment of copolymer side chains. The poled optical medium exhibits a second order nonlinear optical susceptibility $\chi^{(2)}$. A present invention poled optical medium is capable of exhibiting a $\chi^{(2)}$ level of $2 \times 10^{-8}$ esu or higher as measured at 1.34 μm excitation wavelength.

In another embodiment this invention provides an optical light switch or light modulator device which contains a polymeric nonlinear optical component comprising a transparent solid medium of an isotropic acrylic copolymer which is characterized by recurring monomeric units corresponding to the formula:

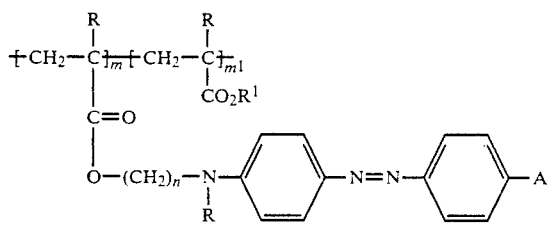

where R is hydrogen or a $C_1$-$C_4$ alkyl substituent; $R^1$ is a $C_1$-$C_6$ alkyl substituent; m and $m^1$ are integers which total at least 10; n is an integer between about 1-20; and A is $-SO_2CF_3$,

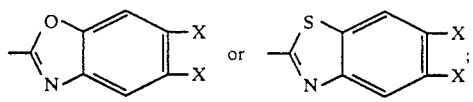

and X is —H, —CN, —NO₂ or —CF₃.

In a present invention optical light switch or light modulator device, the polymeric nonlinear optical component exhibits less than about 10 percent scattering of transmitted incident light waves.

The term "transparent" as employed herein refers to a polymeric optical medium which is transparent or light transmitting with respect to incident fundamental and created light frequencies. In a present invention optical device, the copolymeric thin film nonlinear optical medium component is transparent to both the incident and exit light frequencies.

The term "isotropic" as employed herein refers to a transparent copolymeric optical medium in which the optical properties are equivalent in all tensor directions.

The term "external field" as employed herein refers to an electric, magnetic or mechanical stress field which is applied to a substrate of mobile copolymer molecules, to induce dipolar alignment of the copolymer molecules parallel to the field.

A present invention optical device can be a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as described in U.S. Pat. No. 4,775.215.

The theory of nonlinear harmonic generation by frequency modulation of coherent light is elaborated by A. F. Garito et al in Chapter 1, "Molecular Optics:Nonlinear Optical Properties Of Organic And Polymeric Crystals"; ACS Symposium Series 233 (1983).

An optical interferometric waveguide gate device is described by A. Lattes et al in IEE J. Quantum Electronics, QE-19(11), 171 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

Synthesis Of Monomers And Copolymers

A. Intermediate

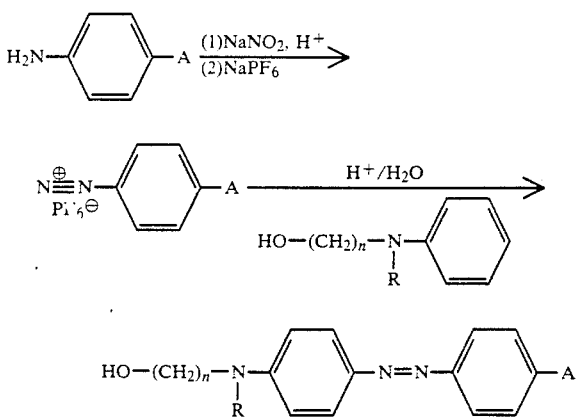

The substituent A is —SO₂CF₃, 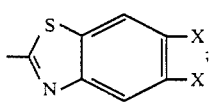

; and X is —H, —CN, —NO₂ or —CF₃.

B. Monomer

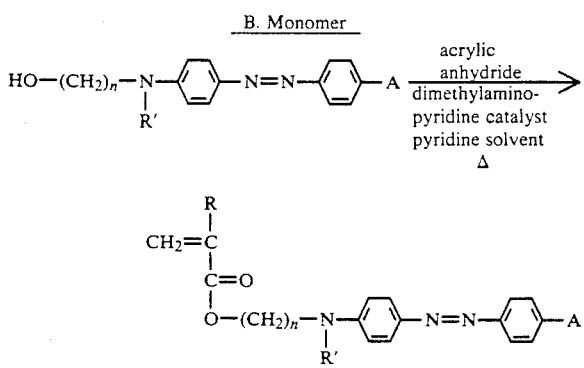

The substituent R' is hydrogen or a $C_1$–$C_4$ alkyl group.

C. Copolymer

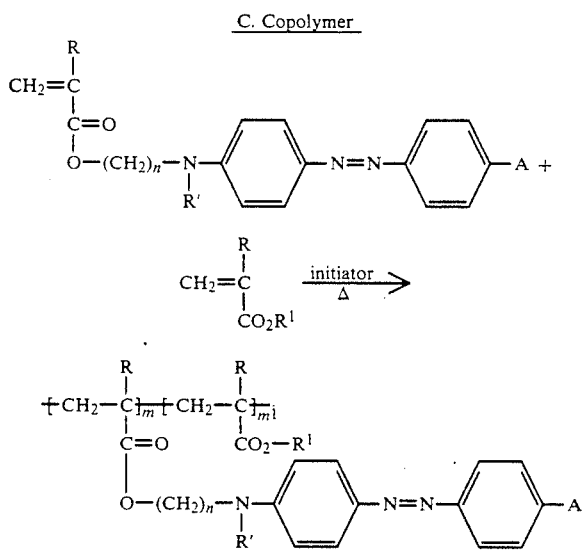

The substituent R is hydrogen or a $C_1$–$C_4$ alkyl group, and $R^1$ is a $C_1$–$C_6$ alkyl group.

D. General Procedure

All reactions are performed under an inert atmosphere using oven-dried glassware and dry solvents.

(1) Step 1

The appropriate 4-acceptor-substituted aniline (1 equiv.) is dissolved in a mixture of HCl and water, and the solution is cooled in an ice bath to approx. 10° C. Sodium nitrite (1 equiv.) in a minimum amount of water is added slowly to the solution, while maintaining the temperature below 10° C. The reaction is then warmed to room temperature and stirred for 15 minutes more. Sodium tetrafluoroborate (1 equiv.) is added as a solid, and the mixture is stirred for 10 additional minutes. The solid is collected by vacuum filtration and dried.

(2) Step 2

The product from step 1 (1 equiv.) is dissolved in a 50:50 mixture of glacial acetic acid and water at 0° C., and the appropriately 4-donor-substituted benzene (1 equiv.) is added dropwise. The reaction is stirred at 0° C. for 15 minutes, and sodium acetate (1.5 equiv.) is added with stirring. The reaction is stirred at 0° C. for 30 minutes and then warmed to room temperature and stirred overnight. The solid product is collected by vacuum filtration and purified by recrystallization or column chromatography.

(3) Step 3 (Monomer)

The product from step 2 (1 equiv.) is dissolved in pyridine, and acrylic anhydride (1 equiv.) and 4-N,N-dimethylaminopyridine (1 mole %) are added with stirring. The reaction is heated at 80° C. until completion. After cooling to room temperature, the solution is poured into water, and the solid monomer is collected by filtration and purified by recrystallization.

(4) Step 4 (Copolymer)

The comonomers (relative ratios to be determined by the desired composition of polymer) are dissolved in a suitable solvent (10% solution by weight), and the solution is degassed for 15 minutes. *AIBN (1 mole %) is added to the solution, and again the mixture is degassed for 15 minutes. The reaction is then heated at 70° C. overnight under argon. After cooling to room temperature, the polymer is precipitated into a nonsolvent and collected by filtration. Purification is effected by redissolving the polymer in an appropriate solvent and precipitating it into a nonsolvent.

*Azo-bis-isobutyronitrile

The side chain copolymers of the present invention have a unique combination of physical and optical properties.

The azostilbene electronic structure in conjugation with electron-donating and electron-withdrawing substituents exhibits exceptional nonlinear optical susceptibility, e.g., an azostilbene containing pendant side chain normally will exhibit a higher level of B response than the closely related stilbene-containing structure in conjugation with comparable electron-donating and electron-withdrawing substituents. In a stilbene structure, the double bond is a relatively passive conduit for electron flow between the electron-donor and electron-withdrawing groups. The azo bridge contributes to an enhancement of second order nonlinear optical susceptibility by functioning as a strong electron withdrawing group.

As a further advantage the azostilbene structure is more easily synthesized than the corresponding stilbene structure, and the azostilbene moiety has excellent thermal, photochemical and hydrolytic stabilities.

A present invention side chain copolymer in the form of a waveguiding medium has particular advantage in comparison with a medium of a liquid crystalline side chain polymer. A present invention optical medium exhibits exceptional optical transparency, while a liquid crystalline medium exhibits a light scattering effect because of deviation from ideal crystalline order. The efficiency of light transmission in an optical waveguide is diminished by light scattering.

The following examples are further illustrative of the present invention. The components and specific ingredients are presented as being typical, and various modifications can be derived in view of the foregoing disclosure within the scope of the invention.

EXAMPLE I

This Example illustrates the preparation of a copolymer (50/50) in accordance with the present invention.

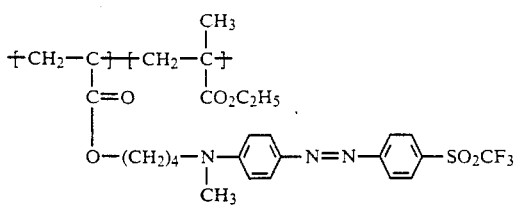

A. N-4-Hydroxybutyl-N-methylaniline (compound A)

A stirred solution of 107.2 g (1 mole) of N-methylaniline, 153.0 g (1 mole) of 4-bromo-1-butanol, 166 g (1 mole) of potassium iodide, and 168 g (2 mole) of sodium bicarbonate in dimethylsulfoxide is heated at 90° C. until the reaction is complete as indicated by thin layer chromatography. After cooling to room temperature, the reaction mixture is poured into a four-fold excess of water, and the aqueous solution is extracted with methylene chloride. The solvent is removed in vacuo, and the residual product is dissolved in a small amount of methylene chloride and swirled with silica gel. After removal of the silica gel, the solution is filtered through cotton and evaporated to yield compound A.

B. 4-Triflylaniline (compound B)

(1) N,N-Dibenzylaniline

A stirred solution of 93.1 g (1 mole) of aniline, 342.1 g (2 mole) of benzyl bromide, and 252 g (3 mole) of sodium bicarbonate in dimethylsulfoxide is heated at 90° C. for three hours. After cooling to room temperature, the reaction mixture is poured into a four-fold excess of water, and the aqueous solution is extracted with methylene chloride. The combined organics are filtered through cotton and evaporated to yield N,N-dibenzylaniline, which is purified by flash chromatography.

(2) 4-Triflyl-N,N-dibenzylaniline

A solution of 273.4 g (1 mole) of N,N-dibenzylaniline and 146.7 g (1.1 mole) of anhydrous aluminum chloride in methylene chloride is cooled to 0° C., and 282.1 g (1 mole) of trifluoromethanesulfonic anhydride is added dropwise to the mixture. The reaction is allowed to warm to room temperature and stir overnight. The solution is poured into water and stirred vigorously for one hour. The layers are separated, and the aqueous layer is extracted with additional methylene chloride. The combined organics are then filtered through cotton and evaporated to yield 4-triflyl-N,N-dibenzylaniline.

(3) 4-Triflylaniline

To a stirred solution of 0.1 g of palladium black in 4.4% formic acid-methanol is added 37.3 g (0.1 mole) of 4-triflyl-N,N-dibenzylaniline in 4.4% formic acid-methanol. The reaction is stirred under an argon atmosphere until complete as indicated by thin layer chromatographic analysis. The catalyst is removed by filtration and washed with additional portions of methanol followed by water. The combined methanol and water washes are evaporated, and compound B is purified by distillation.

C. Synthesis of 4-triflyl-4'-(N-4-hydroxybutyl-N-methylamino)-azobenzene (compound C)

(1) 4-Triflylbenzenediazonium hexafluorophosphate

A stirred solution of 22.5 g (0.1 mole) of 4-triflylaniline in HCl/H2O (50:50) is cooled in an ice bath to about 10° C., and 6.9 g (1 mole) of sodium nitrite in a minimum amount of water is added slowly to the mixture, while maintaining the temperature below 10° C. The reaction then is warmed to room temperature and stirred for 15 additional minutes. Sodium hexafluorophosphate (16.7 g, 0.1 mole) is added in portions, and the mixture is stirred for 10 minutes more. The solid product is collected by vacuum filtration and dried.

(2) 4-Triflyl-4'-(N-4-hydroxybutyl-N-methylamino)azobenzene

To a stirred solution of 38.2 g (0.1 mole) of 4-triflylbenzenediazonium hexafluorophosphate in a 50:50 mixture of glacial acetic acid and water at 0° C. is added 17.9 g (0.1 mole) of N-4-hydroxybutyl-N-methylaniline dropwise. The reaction mixture is stirred at 0° C. for 15 minutes, and 12.3 g (0.15 mole) of sodium acetate is added with stirring. The reaction is stirred at 0° C. for 30 minutes and then warmed to room temperature and stirred for 16 hours. Compound C is collected by filtration and purified by recrystallization from ethanol.

D. Synthesis of acrylate monomer of compound C

To a stirred solution of 41.5 g (0.1 mole) of 4-triflyl-4'-(N-4-hydroxybutyl-N-methylamino)azobenzene in pyridine are added 12.6 g (0.1 mole) of acrylic anhydride and 0.1 g (1.0 mole%) of 4-N,N-dimethylaminopyridine. The reaction is heated at 80° C. for two hours. After cooling to room temperature, the solution is poured into water, and the solid monomer is collected by filtration and purified by recrystallization from nitrobenzene.

E. Formation of 50:50 copolymer with ethyl methacrylate

The acrylate ester of compound C (44.5 g, 0.1 mole) and ethyl methacrylate (11.4 g, 0.1 mole) are dissolved in a suitable solvent (10% solution by weight), and the solution is degassed for 15 minutes. AIBN (1.0 mole%) is added to the stirred solution, and the mixture is degassed again for 15 minutes. The reaction then is heated at 70° C. under argon for 16 hours. After cooling to room temperature, the copolymer is precipitated into methanol and collected by filtration. Purification is effected by redissolving the copolymer in methylene chloride and precipitating it into methanol. The recovered copolymer has a $T_g$ of about 170° C., and exhibits a $\beta$ of $150 \times 10^{-30}$ esu as measured at 1.34 μm excitation wavelength.

Following the same procedures as described above, two copolymers are produced, except that in procedure B the 4-triflyl substituent in 4-triflylaniline is replaced by 4-benzoxazol-2-yl or 4-benzthiazol-2-yl substituent, respectively.

EXAMPLE II

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1.5 μm photoresist coating is achieved by spinning at 50000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm²).

The mask is removed, and a thin piece of silicon (1 cm×2 cm) is placed on the surface of the patterned photoresist as a protective shield, and the combination is exposed to 70 mJ/cm² of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 100° C. for two hours.

A nonlinear optically active organic layer of 1.65 μm thickness is spin-coated on the cladding layer at 3000 rpm. The spin-coating medium is a 20% solution of the Example I copolymer (50/50) of side chain monomer/ethyl methacrylate in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 μm coating of aluminum is deposited as an electrode layer on the upper cladding layer.

The fabricated waveguide is placed in a Mettler hot stage, and the unit is raised to 90° C. at 1° C./min. A DC field of 70 V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $3\times10^{-8}$ esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, a 0.5-1% amount of the fundamental beam is converted into an observed second harmonic radiation.

What is claimed is:

1. An isotropic acrylic copolymer which is characterized by recurring monomeric units corresponding the the formula:

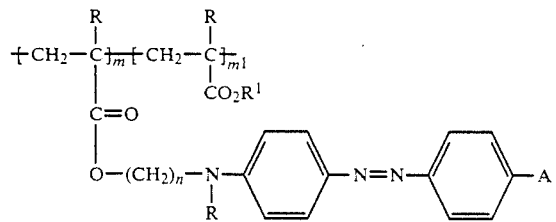

where R is hydrogen or a $C_1$-$C_4$ alkyl substituent; $R^1$ is a $C_1$-$C_6$ alkyl substituent; m and $m^1$ are integers which total at least 10; n is an integer between about 1-20; and A is —$SO_2CF_3$,

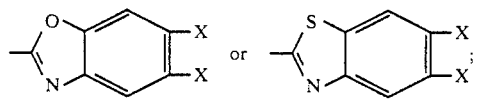

and X is —H, —CN, —$NO_2$ or —$CF_3$.

2. An acrylic copolymer in accordance with claim 1 which has a weight average molecular weight in the range between about 5000-200,000.

3. An acrylic copolymer in accordance with claim 1 which has a glass transition temperature in the range between about 40°-150° C.

* * * * *